(12) United States Patent
Brown et al.

(10) Patent No.: US 6,324,688 B1
(45) Date of Patent: Nov. 27, 2001

(54) METHOD AND APPARATUS FOR OPTIMIZING EXECUTION OF JAVA PROGRAMS

(75) Inventors: Michael Wayne Brown, Georgetown; Joseph Herbert McIntyre; Scott Lee Winters, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/126,282

(22) Filed: Jul. 30, 1998

(51) Int. Cl.[7] ................................................ G06F 9/445
(52) U.S. Cl. ........................................ 717/9; 717/7
(58) Field of Search ............................... 717/9, 7, 5

(56) References Cited

U.S. PATENT DOCUMENTS

| | | | |
|---|---|---|---|
| 5,898,885 * | 4/1999 | Dickol et al. | 712/245 |
| 5,905,895 * | 5/1999 | Halter | 717/9 |
| 5,943,496 * | 8/1999 | Li et al. | 717/9 |
| 5,946,487 * | 8/1999 | Dangelo | 717/5 |
| 5,966,536 * | 10/1999 | Ravichandran | 717/9 |
| 5,966,537 * | 10/1999 | Ravichandran | 717/9 |
| 5,987,256 * | 11/1999 | Wu et al. | 717/7 |
| 5,995,754 * | 11/1999 | Holzle et al. | 717/9 |
| 6,003,038 * | 12/1999 | Chen | 707/103 |
| 6,009,517 * | 12/1999 | Bak et al. | 712/245 |
| 6,035,120 * | 3/2000 | Ravichandran | 717/5 |
| 6,075,942 * | 6/2000 | Cartwright, Jr. | 717/9 |
| 6,081,665 * | 6/2000 | Nilsen et al. | 717/5 |
| 6,083,279 * | 7/2000 | Cuomo et al. | 717/5 |
| 6,093,216 * | 7/2000 | Adl-Tabatabai et al. | 717/9 |
| 6,100,226 * | 8/2000 | Bothner | 717/7 |
| 6,118,940 * | 9/2000 | Alexander, III et al. | 717/7 |
| 6,233,733 * | 5/2001 | Ghosh | 717/7 |

FOREIGN PATENT DOCUMENTS

0905617A2 * 3/1999 (EP) ................................ 395/709

OTHER PUBLICATIONS

Cramer et al.; "Compiling Java Just in Time". IEEE/IEE Electronic Library[online], IEEE Micro, pp. 36–43, May 1997.*

Lamabright, H.D.; "Java Bytecode Optimizations". IEEE/IEE Electronic Library[online]. Proceedings of IEEE Compcon '97, pp. 206–210, Feb. 1997.*

Adl–Tabatabai et al.; "Efficient and Language–Independent Mobile Programs". ACM Digital Library[online]. Proceedings of the ACM SIGPLAN '96, pp. 127–136, May 1996.*

Dean et al.; "Vortex: An Optimizing Compiler for Object–Oriented Languages". ACM Digital Library[online]. Proceedings of the 11th annual conference on OOPSLA, pp. 83–100, Oct. 1996.*

Hsieh et al.; "Java Bytecode to Native Code Translation: The Caffeine Prototype and Preliminary Results". IEEE/IEE Electronic Library[online], Proceedings of the 29th Annual IEEE/ACM International Symposium on Microarchitecture, pp. 90–97, Dec. 1996.*

* cited by examiner

Primary Examiner—Kakali Chaki
Assistant Examiner—Kelvin Booker
(74) Attorney, Agent, or Firm—Duke W. Yee; Jeffrey S. LaBaw; Christopher P. O'Hagan

(57) ABSTRACT

A method and apparatus for optimizing execution of Java programs. A fully caffienated class file is provided in which a standard Java class file, containing a directory and bytecodes, is enhanced to include optimized content and a second directory containing pointers to the optimized content. The second directory contains entries that are distinguished by platforms for which the optimized content is appropriate.

42 Claims, 6 Drawing Sheets

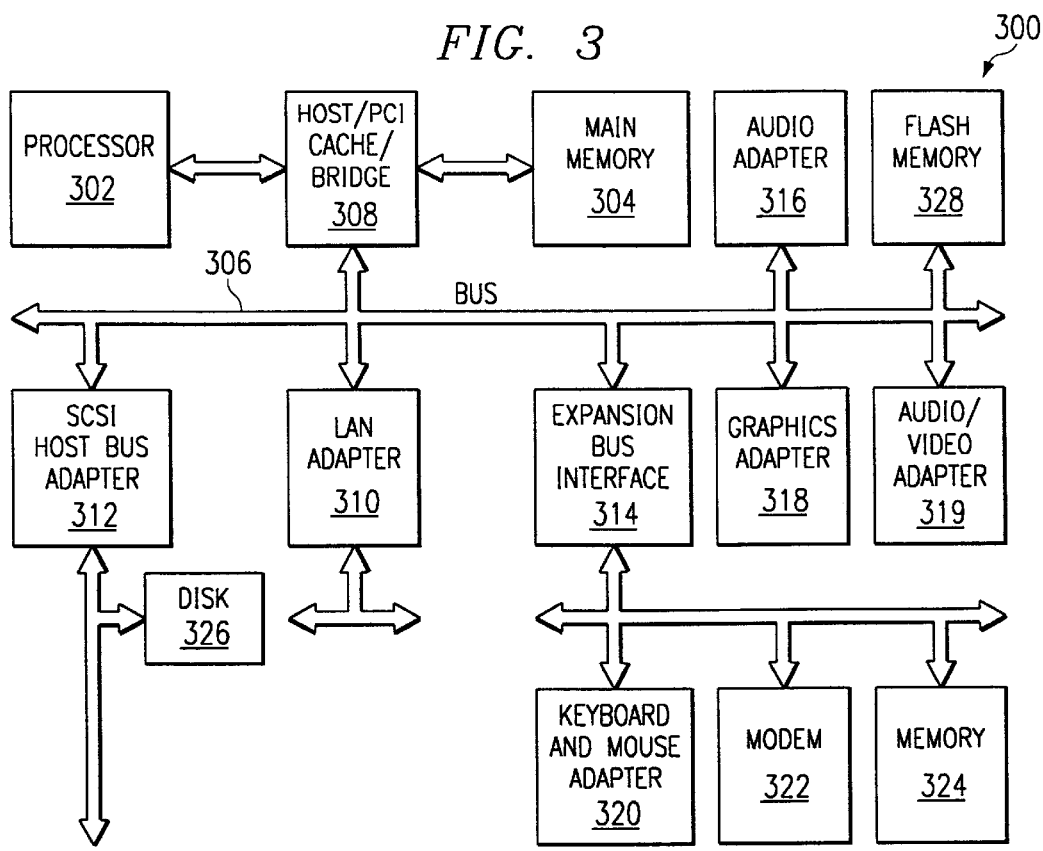
FIG. 3
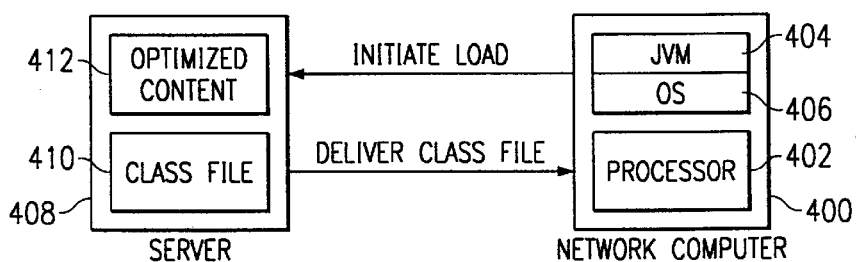
FIG. 4
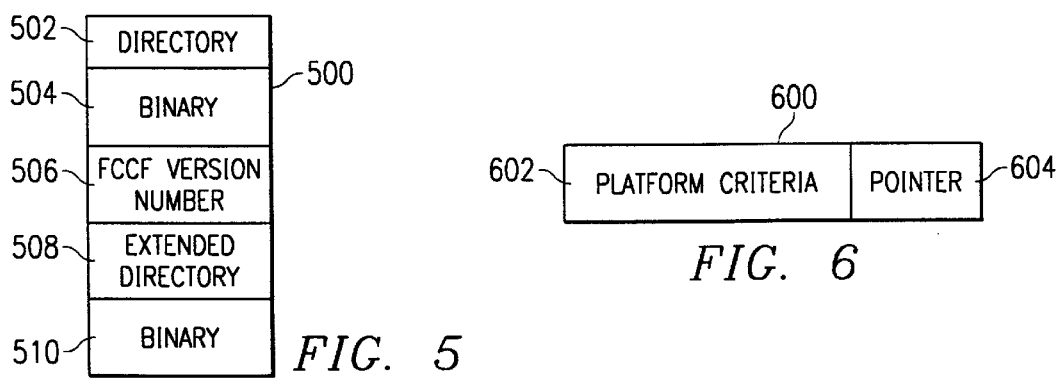
FIG. 5
FIG. 6

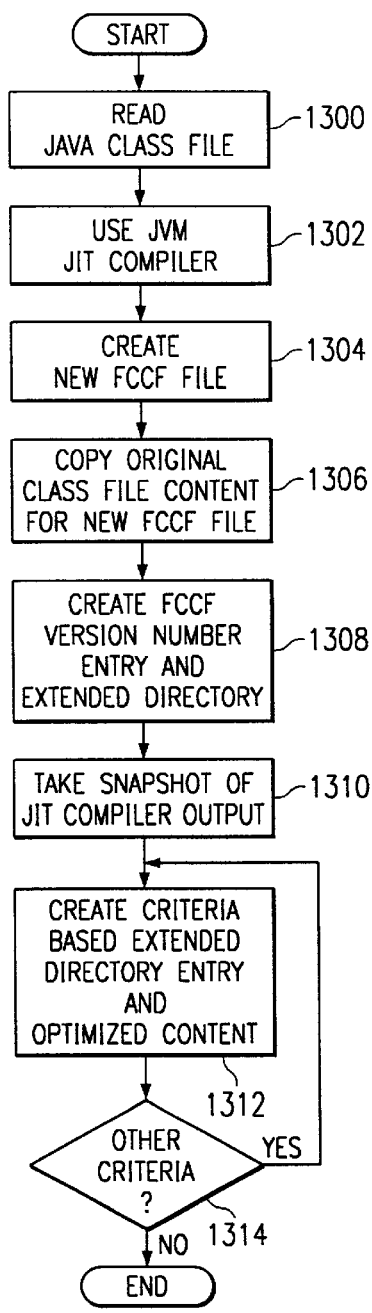
FIG. 13
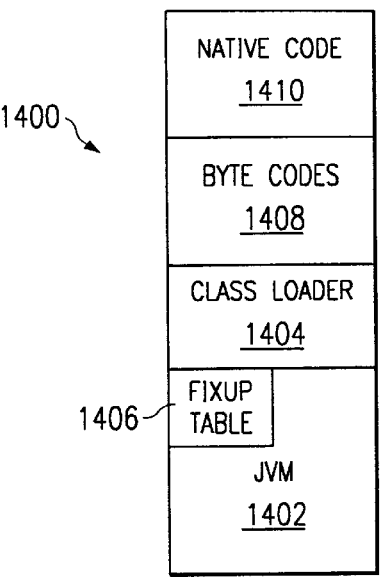
FIG. 14
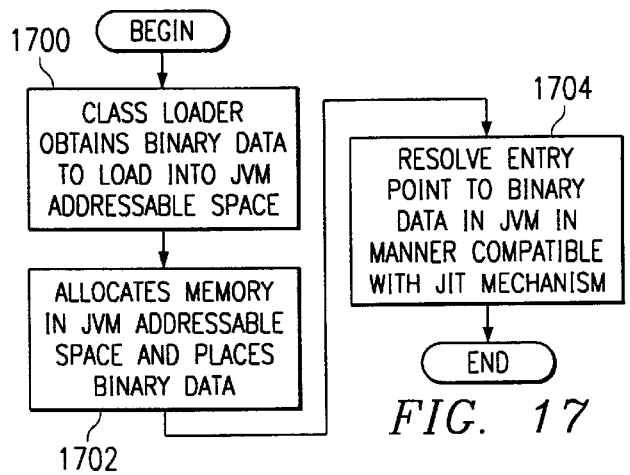
FIG. 17
FIG. 15

METHOD AND APPARATUS FOR OPTIMIZING EXECUTION OF JAVA PROGRAMS

CROSS REFERENCE TO RELATED APPLICATION

The present invention is related to an application entitled Method and Apparatus For Loading Native Object Code in Data Processing System, U.S. Ser. No. 09/126,283, filed even date hereof, assigned to the same assignee and incorporated herein by reference.

BACKGROUND OF THE INVENTION

1. Technical Field

The present invention relates generally to an improved data processing system and in particular to an improved method and apparatus for optimizing execution of code in a data processing system. Still more particularly, the present invention relates to a method and apparatus for optimizing execution of code in a data processing system using code optimized for a particular runtime environment in a data processing system.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program that controls the actual computer or central processing unit (CPU), and device drivers that control the input and output devices (I/O) such as printers and terminals.

A number of application programs are usually present waiting to use the CPU. The operating system determines which program will run next, how much of the CPU time it will be allowed to use, and what other computer resources the application will be allowed to access and use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources in a network. Each computer on a network is connected to the network via an adapter card or other similar means, which provides an ability to establish a communications link to the network.

In corporations, client/server technology is employed in networks to provide a sharing of processing load between a client and a server on a network. Client computers request data and services from a server computer. Client computers may take the form of a network computer (NC), which typically contains fewer components than many personal computers. For example, a network computer may be diskless or have only a single storage device, such as a hard disk drive. Applications are often sent to a network computer from the server. Java applications are becoming increasingly more prevalent as the type of application sent between server and client computers. Java applications are common on the Internet and becoming more increasingly common in intranets and in other types of networks used in corporations.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides only in memory. The JVM allows Java programs to be executed on a different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is a module in the JVM that alternately decodes and executes a bytecode or bytecodes. These bytecode instructions are designed to be easy to interpret on any computer and easily translated on the fly into native machine code.

With the increasing use of network computers having limited processor speed, limited memory, little or no virtual memory support, and/or no secondary storage for temporary files, various run time technologies used in Java are limited or unavailable. For example, just-in-time (JIT) compilers are an example of a run-time technology used to increase the performance of Java programs. A JIT compiler provides an increase in performance by compiling methods into native machine instructions before executing them. The advantages of a JIT compiler are unavailable to many network computers because JIT compiler implementations require significant data processing resources, such as processing power and memory, to provide increase performance.

Therefore, it would be advantageous to have an improved method and apparatus for increasing performance of Java programs without requiring significant data processing resources.

SUMMARY OF THE INVENTION

It is one object of the present invention to improve a data processing system.

It is another object of the present invention for optimizing execution of programs in a data processing system.

It is yet another object of the present invention for optimizing execution of programs in a data processing system using code optimized for a particular runtime environment in a data processing system.

The present invention provides a method and apparatus for optimizing execution of Java programs. A Java class file, containing a directory and bytecodes, is enhanced to include optimized content and a second directory to the optimized content. The second directory provides an entry to the optimized content by associating criteria for different platforms with pointers to optimized content for each particular platform.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a data processing system which may be implemented as a network computer in accordance with a preferred embodiment of the present invention;

FIG. 4 is a diagram illustrating loading of a class file in accordance with a preferred embodiment of the present invention;

FIG. 5 is a diagram of a fully caffienated class file (FCCF) in accordance with a preferred embodiment of the present invention;

FIG. 6 is an illustration of an entry in the extended directory in accordance with a preferred embodiment of the present invention;

FIG. 13 is a flowchart of a modified Java Virtual Machine (JVM) process for creating an FCCF in accordance with a preferred embodiment of the present invention;

FIG. 14 is a diagram illustrating loading of an FCCF into a network computer in accordance with a preferred embodiment of the present invention;

FIG. 15 is a diagram illustrating flags in accordance with a preferred embodiment of the present invention;

FIG. 17 is a flowchart of a process for loading data by a class loader in accordance with a preferred embodiment of the present invention.

DETAILED DESCRIPTION OF THE PREFERRED EMBODIMENT

Figure 1:
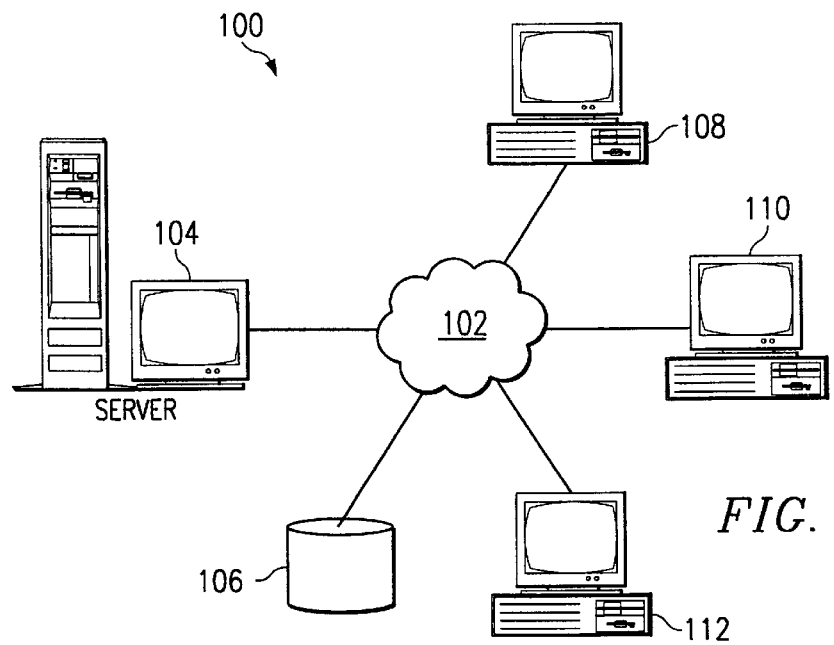
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, network computers (NCs) 108, 110, and 112 also are connected to a network 102. For purposes of this application, a network computer is any computer, coupled to a network, which receives a program or other application from another computer coupled to the network. In the depicted example, server 104 provides data, such as boot files, operating system images, and applications to NCs 108–112. NCs 108, 110, and 112 are clients to server 104. Distributed data processing system 100 may include additional servers, NCs, and other devices not shown. FIG. 1 is intended as an example, and not as an architectural limitation for the processes of the present invention.

Figure 2:
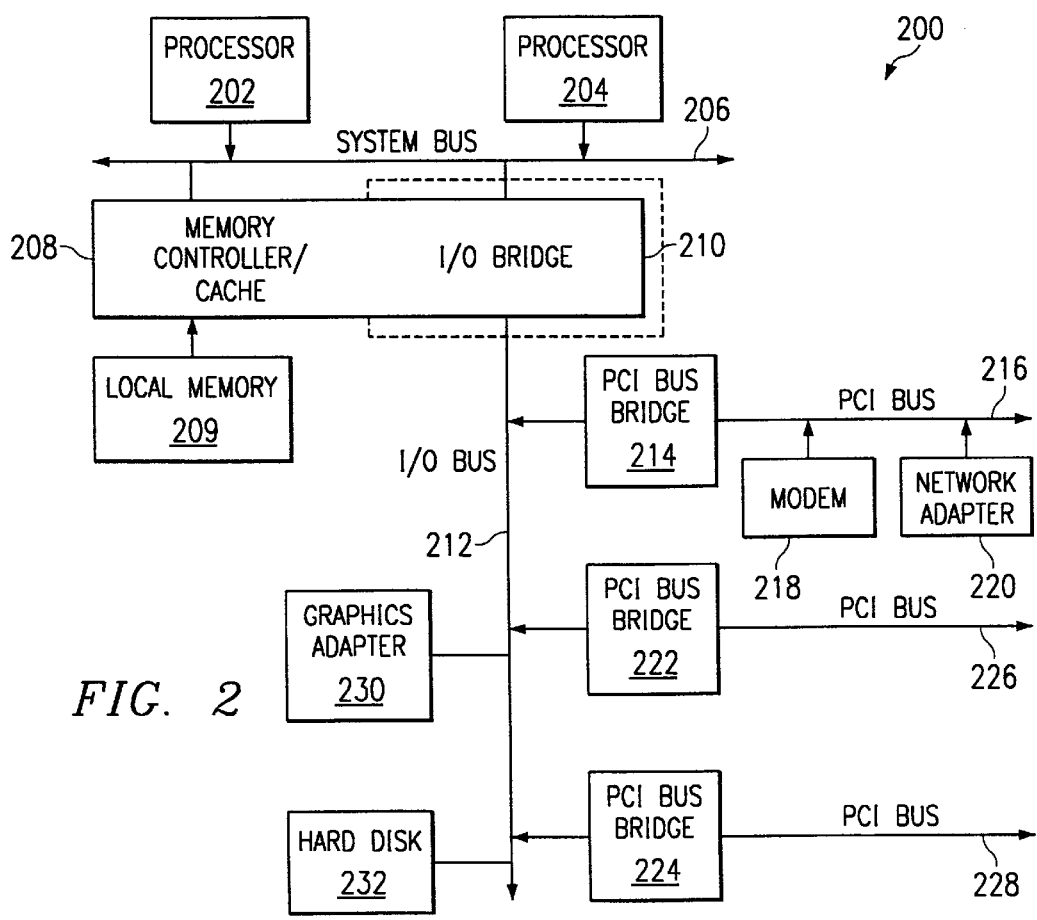
FIG. 2 is a block diagram of a data processing system which may be implemented as a server in accordance with the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

With reference now to FIG. 3, a block diagram of a data processing system 300 which may be implemented as a client computer is illustrated in accordance with a preferred embodiment of the present invention. In the depicted example, data processing system 300 is a network computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for a hard disk drive 326 in the depicted example. A flash memory 328 also is connected to PCI local bus 306 to provide additional storage for data processing system 300. Typical PCI local bus implementations will support three or four PCI expansion slots or add-in connectors. Those of ordinary skill in the art will appreciate that the hardware in FIG. 3 may vary. For example, other peripheral devices, such as optical disk drives and the like may be used in addition to or in place of the hardware depicted in FIG. 3. In addition, if the client computer is a personal computer instead of a network computer, storage devices, such as, a tape drive, and a CD-ROM typically may be included within data processing system 300. The depicted example is not meant to imply architectural limitations with respect to the present invention.

Turning now to FIG. 4, a diagram illustrating loading of a class file is depicted in accordance with a preferred embodiment of the present invention. Network computer 400 in FIG. 4 includes a processor 402, which executes Java Virtual Machine (JVM) 404 and operating system (OS) 406. Server 408 includes class files 410 and optimized content 412. In the depicted example, network computer 400 sends a request to server 408 to initiate loading of a class. In response, a class file from class files 410 is delivered to network computer 400. According to the present invention, class files 410 include fully caffienated class files (FCCFs). These FCCFs contain bytecodes as normal class files, which allows existing JVMs to use these FCCFs. In addition, FCCFs include optimized content, such as data, native code, or pointers to optimized content for the network computer. An enhanced JVM is able to recognize and use optimized content contained within FCCFs.

With reference now to FIG. 5, a diagram of a fully caffienated class file (FCCF) is depicted in accordance with a preferred embodiment of the present invention. FCCF 500 includes a directory 502 and binary 504, which are normally found in a standard Java class file. In addition, a FCCF version number 506, an extended directory 508, and binary 510 are found in FCCF 500. Directory 502 and binary 504 are standard Java class file entries. Binary 504 is a binary stream of data in the form of bytecodes. A JVM that is unable to recognize additional FCCF information will ignore FCCF version number 506, extended directory 508, and binary 510. A standard JVM will be able to read the byte codes within binary 504 using directory 502 and process FCCF 500 as a regular Java class file. On the other hand, a JVM that is able to process these additional sections will process extended directory 508 to gain entry to binary 510, which is a binary stream of data that contains optimized content. This optimized content may include, for example, preformatted data or optimized content for a platform. In the depicted example, an extended directory 508, also referred to as a table of contents, includes a number of entries.

Turning now to FIG. 6, an illustration of an entry in the extended directory in FIG. 5 is depicted in accordance with a preferred embodiment of the present invention. Entry 600 is an entry in extended directory 508 in FIG. 5 and contains platform criteria 602 and pointer 604. In the depicted examples, platform criteria 602 contains criteria that maps to particular processors, JVMs, and operating systems. This criteria is compared to the processor, JVM, and operating system of the network computer on which the FCCF is loaded. A match in platform criteria 602 for an entry results in the associated pointer 604 being used to identify the location of a directory for the particular platform. Pointer 604 may point to a directory within extended directory 508. Alternatively, pointer 604 may point to an external source of optimized content. For example, pointer 604 may be a universal resource locator to optimized content accessed using an Internet protocol.

Figure 7:
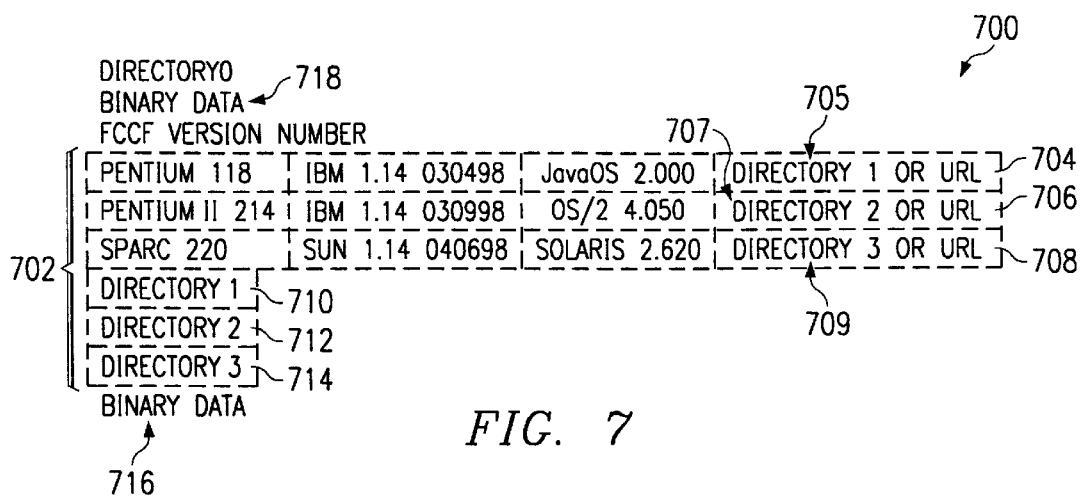
FIG. 7 is an example of a FCCF in accordance with a preferred embodiment of the present invention.

With reference now to FIG. 7, an example of a FCCF is depicted in accordance with a preferred embodiment of the present invention. FCCF 700 illustrates examples of content within an extended directory 702. Platform criteria is found within entries 704, 706, and 708 within extended directory 702. In the depicted FCCF, the criteria used in the entries are the processor type, the JVM, and the operating system. For example, in entry 704, the platform criteria is as follows: Processor PentiumII 2 1 4, JVM IBM 1.1.4 030998, and operating system OS/2 4.0 5 0. Each entry also includes a pointer to a directory or URL associated with the platform criteria. For example, entry 704 includes a pointer to directory 710, entry 706 contains a pointer to directory 712, and entry 708 includes a pointer to directory 714. The relationship of each pointer, 705, 707, and 709, to its directory is a logical relationship. Physical directories 710, 712, and 714, may reside within the FCCF file or-may be accessible as an external resource. The directory also could point to bytecodes within binary data 718 in FCCF 700.

Directories 710, 712, and 714, depending upon the implementation, contain internal file pointers that point to optimized content or data, such as binary data 716. Alternatively, the pointer may reference an external resource, such as, for example, optimized content 412 in server 408 in FIG. 4. The criteria and pointers may be used to provide optimized code for different types of processors. For example, the bytecodes within binary data 718 may be optimized for Big Endian byte order in which the byte whose address is "x . . . x00" is placed at the most significant position in the word. Thus, if the criteria indicates a processor using Big Endian byte order, the pointer would point to binary data 718. On the other hand, if the criteria indicated that the processor uses a Little Endian byte order, in which the byte whose address "x . . . x00" is placed in the least significant position in the word, the pointer may point to code optimized for Little Endian in binary data 716.

An FCCF may be generated in a number of different ways in accordance with a preferred embodiment of the present invention. Each process for creating an FCCF file will always create a file conforming to the FCCF format, and may optionally create additional files that contain the optimized content that is referenced from the extended directory of the FCCF file. This applies to all processes described in FIGS. 8 through 13.

Figure 8:
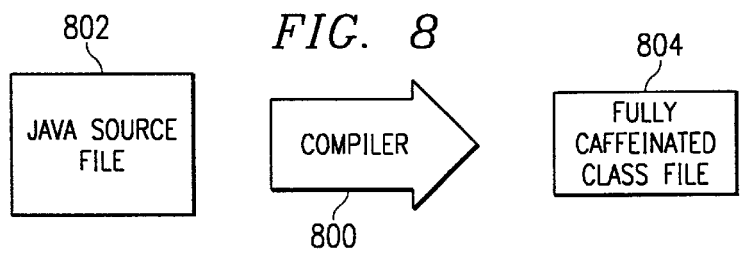
FIG. 8 is a diagram of a traditional compiler process used to create an FCCF in accordance with a preferred embodiment of the present invention.

FIG. 8 is a diagram of a traditional compiler process used to create an FCCF in accordance with a preferred embodiment of the present invention. Traditional compiler 800 takes a Java source file 802 as input and creates an FCCF 804.

Figure 9:
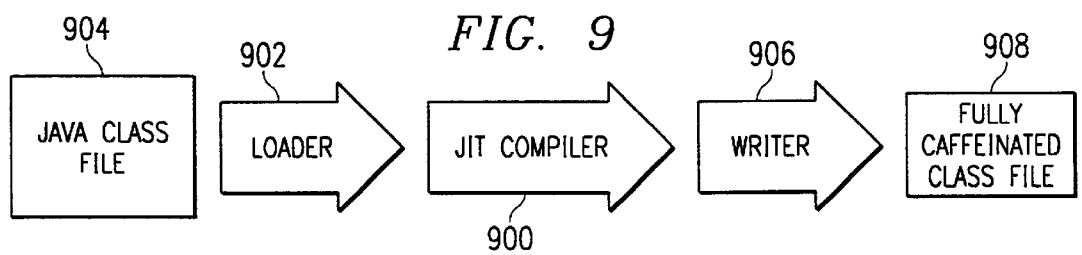
FIG. 9 is a diagram of a wrapped just-in-time (JIT) compiler process used to create an FCCF in accordance with a preferred embodiment of the present invention.

In FIG. 9, a diagram of a wrapped, just-in-time (JIT) compiler process used to create an FCCF is depicted in accordance with a preferred embodiment of the present invention. This wrapped JIT compiler process uses an existing JIT compiler 900 with a loader 902 to read Java class file 904. Writer 906 uses the output of JIT compiler 900 to create an FCCF 908.

Figure 10:
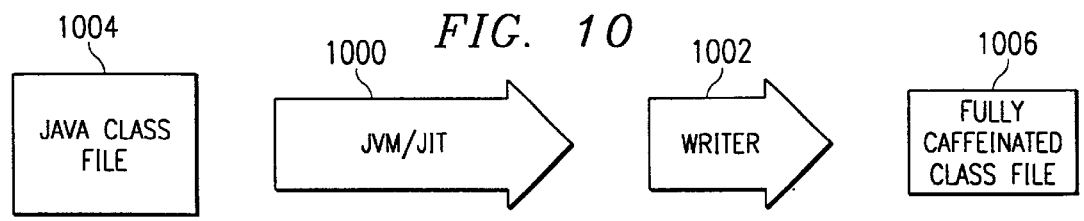
FIG. 10 is a diagram of a modified Java Virtual Machine (JVM) process -used to create an FCCF in accordance with a preferred embodiment of the present invention.

Next, FIG. 10 is a diagram of a modified Java Virtual Machine (JVM) process used to create an FCCF in accordance with a preferred embodiment of the present invention. This process uses an existing JVM with a JIT, JVM/JIT 1000 and includes a writer 1002 to take internal code generated from Java class file 1004 by the JIT compiler within JVM/JIT 1000 and writes it into an FCCF 1006. Flowcharts providing additional details for the processes in FIGS. 8–10 are described below in FIGS. 11–14.

Figure 11:
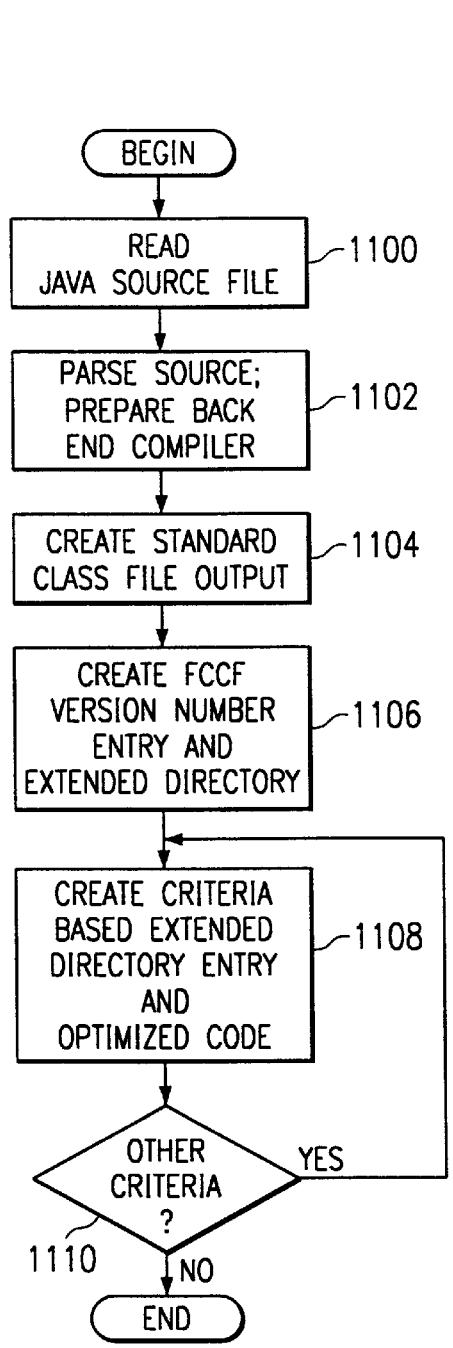
FIG. 11 is a flowchart of a traditional compiler process used to create an FCCF in accordance with a preferred embodiment of the present invention.

Turning now to FIG. 11, a flowchart of a traditional compiler process used to create a fully caffienated class file (FCCF) is depicted in accordance with a preferred embodiment of the present invention. The process begins by reading a Java source file (step 1100). Thereafter, the source file is parsed and back end code is prepared (step 1102). This step is performed by the front end compiler. Next, the back end compiler creates a standard class file output (step 1104). Thereafter, an FCCF version number entry and an extended directory are created by the back end compiler (step 1106). A criteria based extended directory entry is created along with optimized content by the back end compiler (step 1108). The entry includes criteria that defines the platform for which the optimized content is created. Additionally, the entry includes a pointer to the directory for the optimized content, which may be, for example, optimized code for a platform or data. Next, the compiler may create additional entries for other platform criteria (step 1110). For each additional criteria, the process returns to step 1108. When all entries are created, the process terminates.

Figure 12:
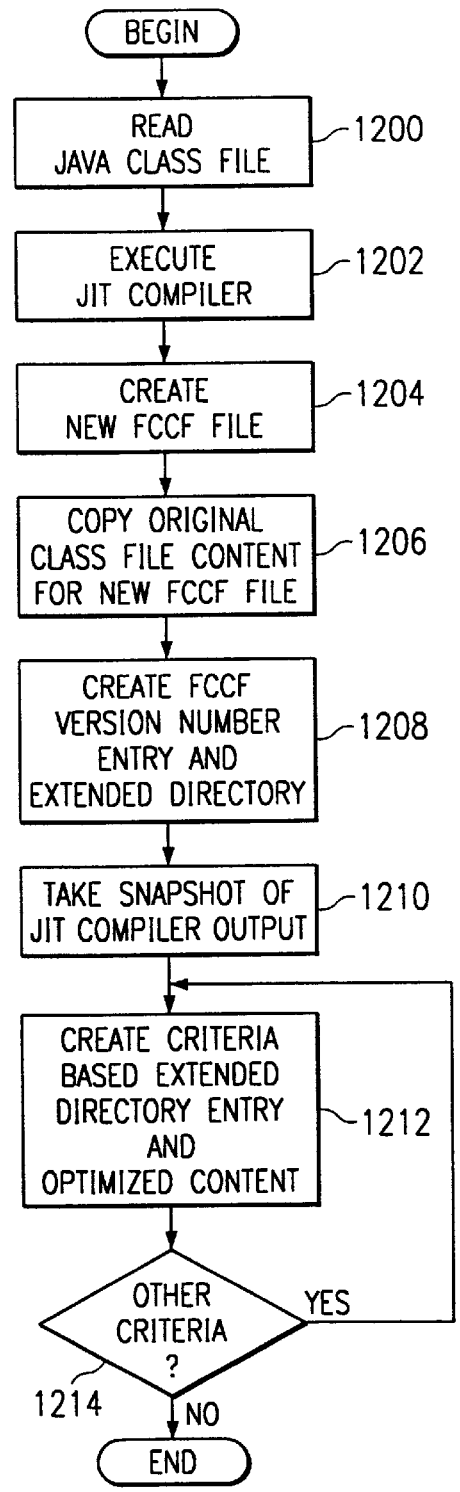
FIG. 12 is a flowchart of a wrapped just-in-time (JIT) compiler process for creating an FCCF in accordance with a preferred embodiment of the present invention.

With reference now to FIG. 12, a flowchart of a wrapped just-in-time (JIT) compiler process for creating a fully caffienated class file (FCCF) is depicted in accordance with a preferred embodiment of the present invention. The process begins by reading a Java class file (step 1200). Thereafter, the JIT compiler is executed to process the bytecodes within the Java class file (step 1202). Thereafter, a new FCCF is created (step 1204). The original class file content is copied for the new FCCF file (step 1206). A FCCF version number entry is created along with an extended directory (step 1208).

Thereafter, a snapshot of the JIT compiler is taken (step 1210). This step is used to identify optimized content for a particular platform. Next, a criteria based extended directory entry and optimized content is created (step 1212). A pointer to the directory for the optimized content is placed in the directory entry along with the criteria. The optimized content in the depicted example is located in the FCCF, but may be located as an external resource with the pointer pointing to the external resource. The compiler may create additional entries for other platform criteria (step 1214). For each additional criteria, the process returns to step 1212. When all entries are created, the process terminates.

Turning next to FIG. 13, a flowchart of a modified Java Virtual Machine (JVM) process for creating a fully caffienated class file (FCCF) is depicted in accordance with a preferred embodiment of the present invention. The process begins by reading the Java class file (step 1300). Thereafter, the JVM/JIT compiler is employed to process the Java class file (step 1302). Thereafter, a new FCCF is created (step 1304). The original class file content is copied for the new FCCF file (step 1306). An FCCF version number entry is created along with an extended directory (step 1308).

Thereafter, a snapshot of the JVM/JIT compiler is taken (step 1310). This step is used to identify optimized content output by the JVM/JIT compiler for a particular platform. Next, a criteria based extended directory entry and optimized content is created (step 1312). The compiler may create additional entries for other platform criteria (step 1314). For each additional criteria, the process returns to step 1312. When all entries are created, the process terminates.

With reference now to FIG. 14, a diagram illustrating loading of native code from an FCCF into a network computer is depicted in accordance with a preferred embodiment of the present invention. Memory 1400 contains JVM 1402, which is a JVM that is enabled for handling an FCCF. JVM 1402 includes a class loader 1404 and a fixup table 1406. Class loader 1404 is enhanced such that the parser within class loader 1404 is able to read the extended directory within the FCCF. For other types of optimized content, mechanisms that provide similar services for the content type will be employed by the JVM.

In addition, class loader 1404 includes an access capability to load data from a pointer reference provided within the extended directory for a particular entry that is selected. Furthermore, class loader 1404 is designed to place the native content within a portion of memory 1400 that is accessible by JVM 1402 to allow run-time access. In the depicted example, bytecodes 1408 and native code 1410 are extracted from the FCCF file. The bytecodes are the same normally found in a Java class file. Native code 1410 is optimized from the optimized content of this type within the FCCF.

In processing an FCCF, bytecodes 1408 are loaded by class loader 1404 in memory 1400 as would normally occur with a normal class file. Class loader 1404 finds optimized content using the extended directory and loads native code 1410 in memory 1400. In the depicted example, fixup table 1406 contains references to both bytecodes and native code 1410. These references are provided so that the JVM knows where to go for the native code or for bytecodes. For native code, class loader 1404 assumes the role normally held by a JIT compiler (not shown) for fixups and placements of native code. The class loader mechanism implemented is compatible with the JIT mechanism in accordance with a preferred embodiment of the present invention. In other words, the optimized content in the FCCF will not be handled by the JIT compiler, though normal bytecodes may still be processed by the JIT compiler. This may be accomplished through the use of a mechanism that provides a compatible interface shared by a FCCF enabled class loader and a JIT compiler.

In FIG. 15, a diagram illustrating information that may be found within a fixup table is depicted in accordance with a preferred embodiment of the present invention. Fixup table 1500 contains names of methods in section 1502, bytecode locations in 1504, an indication of whether the method has been jitted in section 1506 long with native code location in section 1508. Fixup table 1500 includes other information, which is not shown in order to avoid obscuring the important features of the present invention.

The memory locations located in sections 1504 and 1508 are within a single address space showing the location at which the bytecodes or native code begins. Section 1506 contains indicators as to whether the methods in section 1502 have been jitted. Typically, the indicators in section 1506 are set after a method has been jitted by a JIT compiler, if present. If optimized content, such as native code, is provided by an FCCF, the indicator in section 1506 will be a "Y" and the location of the optimized content will be placed in section 1508. This figure displays one implementation of a compatible interface shared by a FCCF enabled class loader and a JIT compiler.

According to the present invention, when optimized content is present in the FCCF, the flag may be preset so that the JIT compiler does not process the bytecodes associated with the method. In the depicted diagram, the optimized content is assumed to be placed in memory before the fixup table information is updated.

Figure 16:
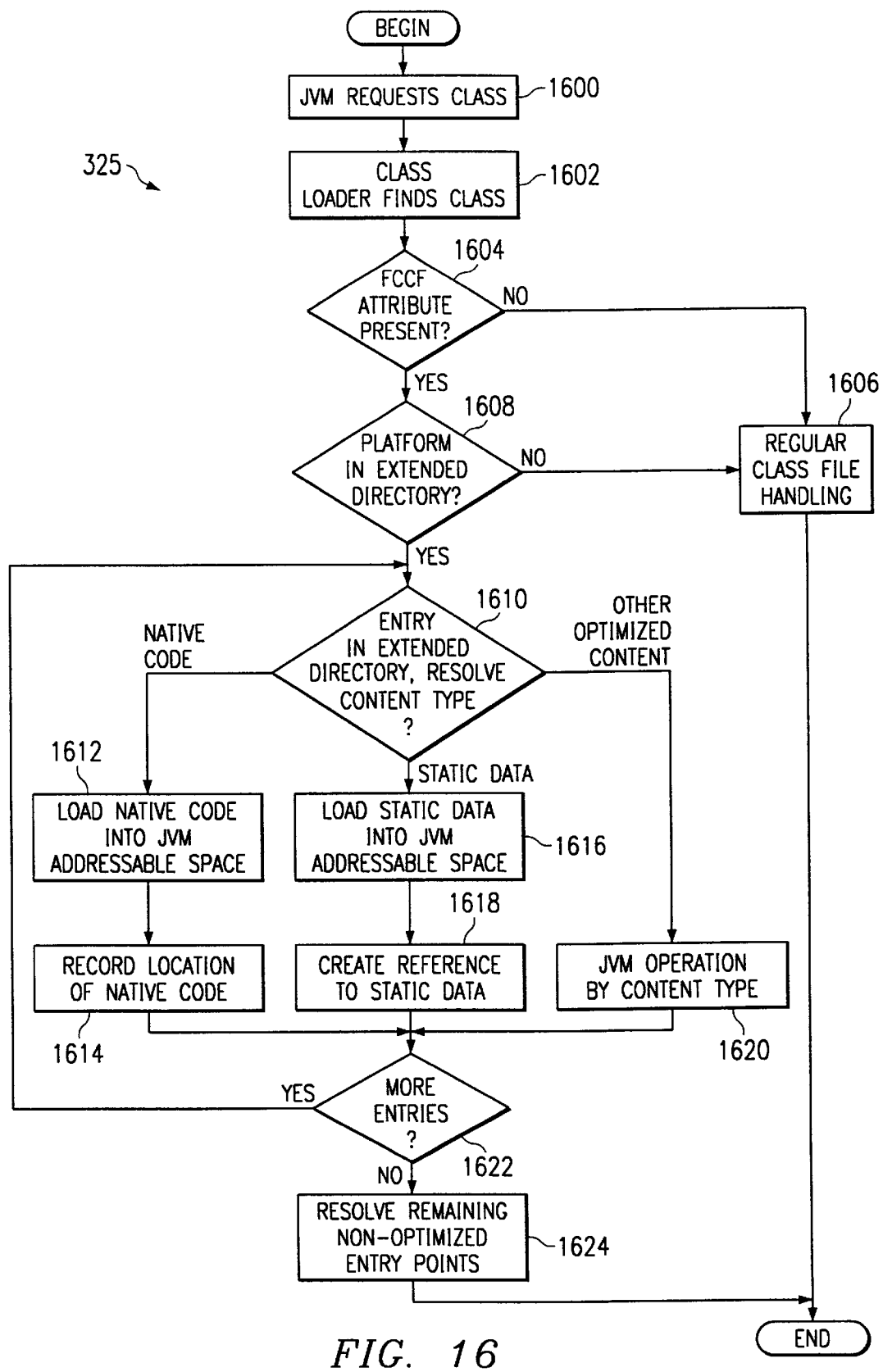
FIG. 16 is a flowchart of a process for loading a class file in accordance with a preferred embodiment of the present invention.

Turning next to FIG. 16, a flowchart of a process for loading a class file is depicted in accordance with a preferred embodiment of the present invention. The process begins with the JVM requesting a class (step 1600). The class loader then finds the class (step 1602). The class loader finds the class using its normal class resolution method, which may include searching on a file system, within a Java Archive file or across an HTTP connection. Upon finding the class, contents of the class will be streamed into the JVM for processing. Thereafter, a determination is then made as to whether an FCCF file attribute is present (step 1604). This file attribute is used to distinguish an FCCF from a normal class file. If the attribute is missing, then regular file class handling occurs (step 1606) with the processing terminating thereafter.

When present, the attribute contains the version number, so that the inclusion of this attribute indicates that this file is an FCCF file and provides the version number.

A determination is then made as to whether the platform is in the extended directory (step 1608). In this step, a comparison of the platform on which the JVM is executing is made with the criteria in the extended directory. The criteria compared in the depicted example includes the processor, the JVM, and the operating system. If a compatible criteria is not found, regular class handling occurs in step 1606. Otherwise, the entry in the extended directory is resolved to determine the content type (step 1610). This step is used to process each entry in the extended directory. If the content type is code, the code is loaded into JVM addressable space (step 1612), and the location of the native code is recorded in a manner compatible for the process for recording the location of JIT created native code within the JVM (step 1614).

With reference again to step 1610, if the content type is static data, the static data is loaded into JVM addressable space (step 1616). Next, a reference to the static data is then created in a manner compatible with the JVM for access to static data when created using the normal JVM procedure (step 1618). If the content is another type of optimized content, this content is processed based on that content type (step 1620). The processing that occurs depends on the content encountered and the JVM implementation. A JVM that does not recognize the content type should ignore the content type and its related content. Thereafter, a determination is made as to whether additional entries are present for processing (step 1622). If additional entries are present, the process returns to step 1610. Otherwise, remaining non-optimized entry points are resolved (step 1624) with the process terminating thereafter.

With reference now to FIG. 17, a flowchart of a process for loading data by a class loader is depicted in accordance with a preferred embodiment of the present invention. The process begins by the class loader obtaining binary data for loading into JVM addressable space in the memory (step 1700). Next, the class loader creates space in the JVM addressable space and places the binary data in the created space (step 1702). Thereafter, the entry point to the binary data in the JVM is resolved in manner compatible with the JIT mechanism (step 1704). This entry point may be resolved in the manner described above in FIG. 14 with respect to the use of flags.

Thus, the present invention provides an improved method and apparatus for optimizing execution of Java programs. This advantage is provided by an FCCF, which is a compatible extension of the Java class file to enable delivery of platform optimized content. The present invention creates additional entries within the class file that provide optimized content for a particular platform. This optimized content may be, for example, preformatted data, optimized bytecode streams, or native code. The present invention also allows existing JVMs to execute the original Java bytecodes while providing an enhanced JVM an ability to recognize and utilize the optimized content contained within the same file. Through providing optimized content in an FCCF, the inability of some network computers to efficiently use a JIT compiler is alleviated.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for optimizing execution of an application in a data processing system, the method comprising the data processing system implemented steps of:

providing a class file, wherein the class file includes a directory and bytecodes;

modifying the class file to add optimized content to the class file, wherein the optimized content is optimized for the data processing system; and adding a second directory to the class file, wherein the second directory provides access to the optimized content.

2. The method of claim 1, wherein the optimized content is native code.

3. The method of claim 1, wherein the optimized content is optimized bytecodes.

4. The method of claim 1, wherein the optimized content is preformatted data.

5. The method of claim 1, wherein the optimized content is a pointer to content located external to the class file.

6. A method for optimizing execution of an application in a data processing system, the method comprising the data processing system implemented steps of:

providing a class file, wherein the class file includes a directory and bytecodes;

modifying the class file to add optimized content to the class file, wherein the optimized content is optimized for the data processing system; and adding a second directory to the class file, wherein the second directory provides access to the optimized content, wherein the optimized content includes a pointer to content located external to the class file, and the pointer is a universal resource locator.

7. A method for optimizing execution of an application in a data processing system, the method comprising the data processing system implemented steps of:

providing a class file, wherein the class file includes a directory and bytecodes;

modifying the class file to add optimized content to the class file, wherein the optimized content is optimized for the data processing system; and adding a second directory to the class file, wherein the second directory provides access to the optimized content, wherein the optimized content includes a pointer to content located external to the class file, and the pointer points to optimized content on a server.

8. A method for optimizing execution of an application in a data processing system, the method comprising the data processing system implemented steps of:

providing a class file, wherein the class file includes a directory and bytecodes;

modifying the class file to add optimized content to the class file, wherein the optimized content is optimized for the data processing system; and adding a second directory to the class file, wherein the second directory provides access to the optimized content, wherein the second directory includes a plurality of entries in which each entry includes criteria and a pointer.

9. The method of claim 8, wherein the pointer is a universal resource locator.

10. The method of claim 8, wherein the pointer points to optimized content stored on a server.

11. The method of claim 8, wherein the criteria includes a processor type.

12. The method of claim 8, wherein the pointer points to code optimized for the processor type.

13. The method of claim 8, wherein the criteria includes a operating system type.

14. The method of claim 8, wherein the criteria includes Java virtual machine type.

15. A method for processing a class file by a platform in a data processing system, the method comprising:

loading the class file, wherein the class file includes a plurality of bytecodes; a first directory, wherein the directory points to the plurality of bytecodes; content including native content optimized for the platform; a second directory including a plurality of criteria associated with a plurality of pointers, wherein each pointer points to a portion of the content;

comparing the platform to the plurality of criteria; and utilizing the optimized content using a pointer associated with criteria matching the platform.

16. The method of claim 15 further comprising:

utilizing the bytecodes.

17. A method for processing a class file by a platform in a data processing system, the method comprising:

loading the class file, wherein the class file includes a plurality of bytecodes; a first directory, wherein the directory points to the plurality of bytecodes; content including native content optimized for the platform; a second directory including a plurality of criteria associated with a plurality of pointers, wherein each pointer points to a portion of the content;

comparing the platform to the plurality of criteria; and utilizing the optimized content using a pointer associated with criteria matching the platform, wherein the bytecodes are utilized in response to an absence of a match between the platform and the plurality of criteria.

18. The method of claim 16, wherein the bytecodes are utilized in addition to utilizing the optimized content.

19. The method of claim 15, wherein the pointer is a universal resource locator.

20. The method of claim 15, wherein the pointer points to optimized content stored on a server.

21. The method of claim 15, wherein the criteria includes a processor type.

22. The method of claim 21, wherein the pointer points to code optimized for the processor type.

23. The method of claim 21, wherein the criteria includes a operating system type.

24. The method of claim 21, wherein the criteria includes Java virtual machine type.

25. A data structure, in a computer readable medium, comprising:

a plurality of bytecode;

a first directory, wherein the directory points to the plurality of bytecode;

optimized content; and a second directory including a plurality of criteria associated with a plurality of pointers, wherein each pointer points to a directory of optimized content.

26. The data structure of claim 25 further comprising:

an additional criteria and an additional pointer associated with the additional criteria, wherein the pointer points to a source of instructions optimized for the particular data processing system in which the source is located outside of the data structure.

27. The data structure of claim 26, wherein the source is a storage device located on a server.

28. The data structure of claim 26, wherein the additional pointer is a universal resource locator.

29. A data processing system for optimizing execution of an application in the data processing system, the data processing system comprising:

providing means for providing class file, wherein the class file includes a directory and bytecodes; and modification means for modifying the class file to add optimized content to the class file, wherein the optimized content is optimized for the data processing system; and adding means for adding a second directory, wherein the second directory provides access to the optimized content.

30. The data processing system of claim 29, wherein the optimized content is native code.

31. The data processing system of claim 29, wherein the optimized content is preformatted data.

32. A data processing system for optimizing execution of an application in the data processing system, the data processing system comprising:

providing means for providing class file, wherein the class file includes a directory and bytecodes; and modification means for modifying the class file to add optimized content to the class file, wherein the optimized content is optimized for the data processing system; and adding means for adding a second directory, wherein the second directory provides access to the optimized content, wherein the optimized content includes a pointer to content located external to the class file.

33. The data processing system of claim 32, wherein the pointer is a universal resource locator.

34. The data processing system of claim 32, wherein the pointer points to optimized content stored on a server.

35. A data processing system for optimizing execution of an application in the data processing system, the data processing system comprising:

providing means for providing class file, wherein the class file includes a directory and bytecodes; and modification means for modifying the class file to add optimized content to the class file, wherein the optimized content is optimized for the data processing system; and adding means for adding a second directory, wherein the second directory provides access to the optimized content, wherein the second directory includes a plurality of entries in which each entry includes criteria and a pointer.

36. The data processing system of claim 35, wherein the pointer is a universal resource locator.

37. The data processing system of claim 35, wherein the pointer points to optimized content stored on a server.

38. The data processing system of claim 35, wherein the criteria includes a processor type.

39. The data processing system of claim 35, wherein the pointer points to code optimized for the processor type.

40. The data processing system of claim 35, wherein the criteria includes a operating system type.

41. The data processing system of claim 35, wherein the criteria includes Java virtual machine type.

42. A computer program product for optimizing execution of an application in a data processing system, the computer program product comprising:

a computer usable medium;

first instructions for providing class file, wherein the class file includes a directory and bytecodes;

second instructions for modifying the class file to add optimized content to the class file, wherein the optimized content is optimized for the data processing system; and third instructions for adding a second directory, wherein the second directory provides access to the optimized content, wherein the instructions are embodied within the computer usable medium.

* * * * *